United States Patent
Murai et al.

(10) Patent No.: US 6,628,667 B1
(45) Date of Patent: Sep. 30, 2003

(54) VARIABLE RATE TRANSMITTING METHOD AND APPARATUS USING BI-ORTHOGONAL FUNCTIONS FOR VARIABLE RATE TRANSMISSION RATES ABOVE A PREDETERMINED VALUE

(75) Inventors: Hideshi Murai, Tokyo (JP); Hisao Tachika, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/230,483

(22) PCT Filed: Sep. 12, 1997

(86) PCT No.: PCT/JP97/03224

§ 371 (c)(1),
(2), (4) Date: Jan. 26, 1999

(87) PCT Pub. No.: WO98/59451

PCT Pub. Date: Dec. 30, 1998

(30) Foreign Application Priority Data

Jun. 20, 1997 (JP) ................................. 6-164202

(51) Int. Cl.⁷ .............................. H04J 3/16; H04J 3/22
(52) U.S. Cl. ...................... 370/468; 370/335; 370/342; 375/146
(58) Field of Search ................................ 370/337, 441, 370/319, 209, 335, 342; 375/206, 207, 208, 130, 146; 379/56.2

(56) References Cited

U.S. PATENT DOCUMENTS

| 5,353,352 A | * | 10/1994 | Dent et al. ................... 370/342 |
|---|---|---|---|
| 5,515,396 A | | 5/1996 | Dalekotzin |
| 5,751,761 A | * | 5/1998 | Gilhousen .................... 375/146 |
| 5,777,990 A | | 7/1998 | Zehavi et al. |
| 5,809,060 A | * | 9/1998 | Cafarella et al. ............ 375/206 |
| 5,966,377 A | * | 10/1999 | Murai .......................... 370/342 |
| 6,064,663 A | * | 5/2000 | Honkasalo et al. ......... 370/335 |
| 6,185,246 B1 | * | 2/2001 | Gilhousen .................... 375/130 |
| 6,424,619 B2 | * | 7/2002 | Odenwalder et al. ....... 370/209 |

FOREIGN PATENT DOCUMENTS

| JP | 5-506763 | 9/1993 |
|---|---|---|
| JP | 6-501349 | 2/1994 |
| JP | 7-303090 | 11/1995 |
| WO | 9217012 | 10/1992 |
| WO | 9523459 | 8/1995 |
| WO | 9627250 | 9/1996 |
| WO | 9636144 | 11/1996 |
| WO | 9717789 | 5/1997 |

\* cited by examiner

*Primary Examiner*—Hassan Kizou
*Assistant Examiner*—David Odland
(74) *Attorney, Agent, or Firm*—Birch, Stewart, Kolasch & Birch, LLP

(57) ABSTRACT

Described is a variable rate transmission apparatus for spread modulating data signals by using spread code sequences and transmitting the processed signals. The variable rate transmission apparatus spread modulates the data signals, upon the condition that the transmission rate of each data signal is greater than or equal to a predetermined transmission rate, in a binary sequence using bi-orthogonal signals and transmits the processed signals.

6 Claims, 13 Drawing Sheets

FIG.2 PRIOR ART
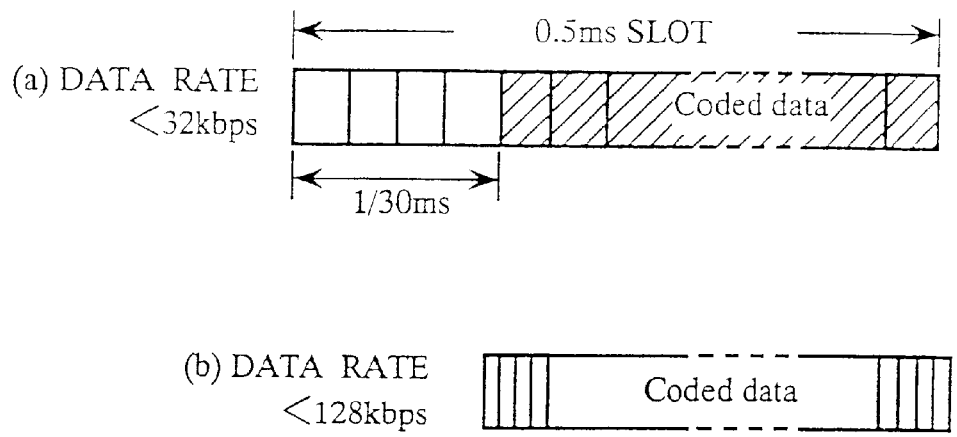
FIG.3 PRIOR ART
(a) DATA RATE
<32 (128) kbps
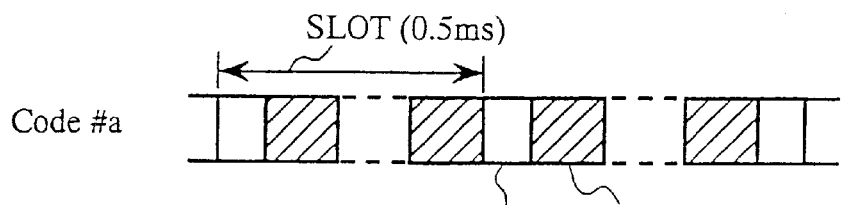
(b) DATA RATE
>32 (128) kbps
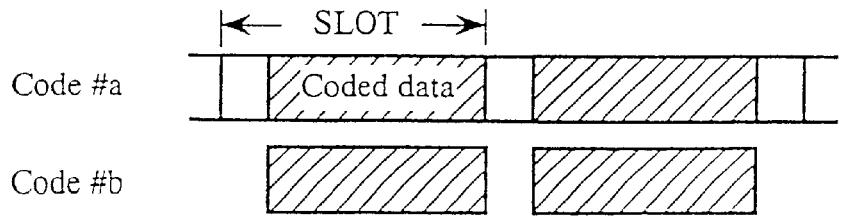

FIG.11
(a)
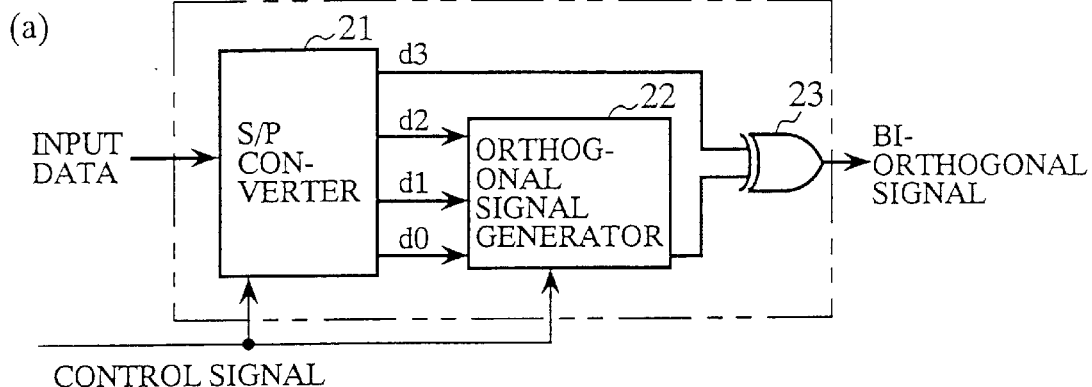
(b)
| d3 | d2 | d1 | d0 | Code Seq. (BI-ORTHOGONAL SIGNALS) | |
|----|----|----|----|------|----------|
| 0 | 0 | 0 | 0 | W8 (0) | 0 0 0 0 0 0 0 0 |
| 0 | 0 | 0 | 1 | W8 (1) | 0 1 0 1 0 1 0 1 |
| 0 | 0 | 1 | 0 | W8 (2) | 0 0 1 1 0 0 1 1 |
| 0 | 0 | 1 | 1 | W8 (3) | 0 1 1 0 0 1 1 0 |
| 0 | 1 | 0 | 0 | W8 (4) | 0 0 0 0 1 1 1 1 |
| 0 | 1 | 0 | 1 | W8 (5) | 0 1 0 1 1 0 1 0 |
| 0 | 1 | 1 | 0 | W8 (6) | 0 0 1 1 1 1 0 0 |
| 0 | 1 | 1 | 1 | W8 (7) | 0 1 1 0 1 0 0 1 |
| 1 | 0 | 0 | 0 | −W8 (0) | 1 1 1 1 1 1 1 1 |
| 1 | 0 | 0 | 1 | −W8 (1) | 1 0 1 0 1 0 1 0 |
| 1 | 0 | 1 | 0 | −W8 (2) | 1 1 0 0 1 1 0 0 |
| 1 | 0 | 1 | 1 | −W8 (3) | 1 0 0 1 1 0 0 1 |
| 1 | 1 | 0 | 0 | −W8 (4) | 1 1 1 1 0 0 0 0 |
| 1 | 1 | 0 | 1 | −W8 (5) | 1 0 1 0 0 1 0 1 |
| 1 | 1 | 1 | 0 | −W8 (6) | 1 1 0 0 0 0 1 1 |
| 1 | 1 | 1 | 1 | −W8 (7) | 1 0 0 1 0 1 1 0 |
(c)
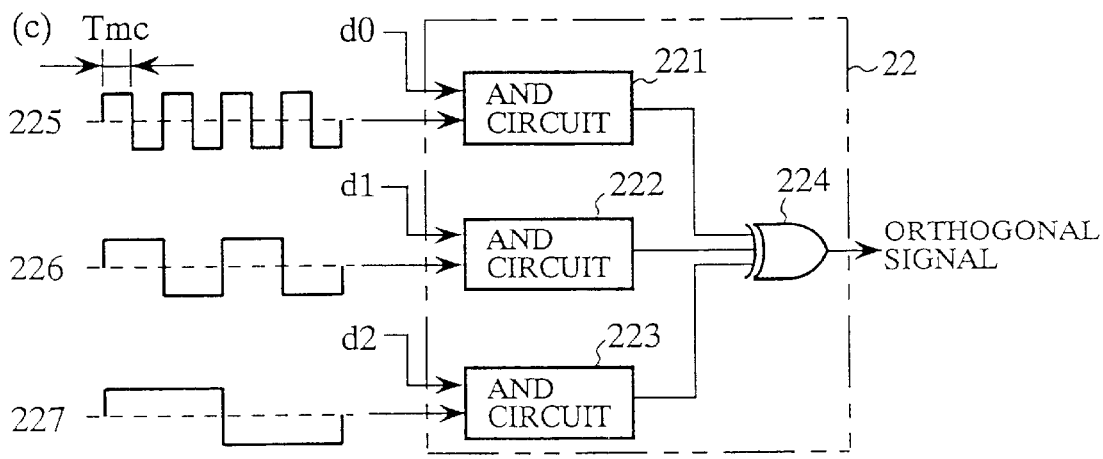

(a)

(b)

| d3 | d2 | d1 | d0 | Code Seq. (BI-ORTHOGONAL SIGNALS) | |
|---|---|---|---|---|---|
| 0 | 0 | 0 | 0 | W8 (0) | 0 0 0 0 0 0 0 0 |
| 0 | 0 | 0 | 1 | W8 (1) | 0 1 0 1 0 1 0 1 |
| 0 | 0 | 1 | 0 | W8 (2) | 0 0 1 1 0 0 1 1 |
| 0 | 0 | 1 | 1 | W8 (3) | 0 1 1 0 0 1 1 0 |
| 0 | 1 | 0 | 0 | W8 (4) | 0 0 0 0 1 1 1 1 |
| 0 | 1 | 0 | 1 | W8 (5) | 0 1 0 1 1 0 1 0 |
| 0 | 1 | 1 | 0 | W8 (6) | 0 0 1 1 1 1 0 0 |
| 0 | 1 | 1 | 1 | W8 (7) | 0 1 1 0 1 0 0 1 |
| 1 | 0 | 0 | 0 | −W8 (7) | 1 0 0 1 0 1 1 0 |
| 1 | 0 | 0 | 1 | −W8 (6) | 1 1 0 0 0 0 1 1 |
| 1 | 0 | 1 | 0 | −W8 (5) | 1 0 1 0 0 1 0 1 |
| 1 | 0 | 1 | 1 | −W8 (4) | 1 1 1 1 0 0 0 0 |
| 1 | 1 | 0 | 0 | −W8 (3) | 1 0 0 1 1 0 0 1 |
| 1 | 1 | 0 | 1 | −W8 (2) | 1 1 0 0 1 1 0 0 |
| 1 | 1 | 1 | 0 | −W8 (1) | 1 0 1 0 1 0 1 0 |
| 1 | 1 | 1 | 1 | −W8 (0) | 1 1 1 1 1 1 1 1 |

VARIABLE RATE TRANSMITTING METHOD AND APPARATUS USING BI-ORTHOGONAL FUNCTIONS FOR VARIABLE RATE TRANSMISSION RATES ABOVE A PREDETERMINED VALUE

This application is the national phase under 35 U.S.C. §371 of prior PCT International Application No. PCT/JP97/03224 which has an International filing date of Sep. 12, 1997 which designated the United States of America.

TECHNICAL FIELD

The present invention relates to an apparatus for spectrum spread communication using a CDMA mobile communication system, and particularly for a CDMA variable rate transmission method with stable performance for high-speed transmission and a variable rate transmission apparatus based on the method.

BACKGROUND ART

Active research and development have been carried out for third-generation mobile communication systems. In the next-generation third system, because multimedia communications are considered as main service, there has been a demand for the function of high capacity and for the function of data transmission of various rates with the required minimum transmission power on a flexible and high-quality basis. There is much attention on a multiple access system using a spectrum spread communication, i.e., a CDMA (Code Division Multiple Access) system as the radio access for this next generation radio.

Spectrum spread communications based on direct sequence are communications in which an information signal is multiplied by spreading which results in a transmission band width wider than the information signal band width. The spectrum spread communication has features such as low probability of intercept, anti-interference, anti-multipath fading, multiple access possibility, etc. The multiple accessing system means that a plurality of mobile stations communicate simultaneously with a base station. The performance of the spectrum spread communication depends on a spreading factor. The spreading factor indicates the ratio of the transmission band to the information signal band, i.e., the ratio between a spreading-code rate and an information transmission rate. One obtained by representing the spreading factor in decibel (dB) is called "processing gain". When the information transmission rate is 10 kbps and the spreading-code rate is 1 Mcps (chips per second), for example, the spreading factor reaches 100 and the processing gain results in 20 dB.

As described above, the multiple access system using the spectrum spread communication is called "CDMA". In the present CDMA system, different spreading codes are used in every user or channel to identify the users or channels.

It has been reported by Gillhauzen et. al from the following reference that the CDMA system is superior to other multiple access systems such as a TDMA (Time Division Multiple Access) system in channel capacity (the number of channels in the same band). The reference is as follows: "On the Capacity of a Cellular CDMA System", IEEE Transactions on Vehicular Technology vol. 40, No. 2, May.

In addition to this, the CDMA system has an advantage that since all the radio cells (radio zones) are allowed to use the same frequency, the CDMA system can relatively easily implement diversity handoff (or soft handoff) which are not handled well by the TDMA system. Further, in contrast with the TDMA system, multipath signals, which might degrade quality multi-path signals, are separated from others and identified by RAKE reception and can be effectively synthesized in reverse. Thus excellent transmission quality can be achieved with less transmitting power.

FIG. 1 is a block diagram showing an un-link transmission system employed in the conventional coherent multicode DS-CDMA (Direct Sequence CDMA). In the up-link transmission system, the length of one frame is 10 ms and where the user data and control data (c) are multiplexed on a time basis. In order to detect an error produced in the frame, a 16-bit CRC (Cyclic Redundancy Check) is used to perform error detector coding and a 6-bit tail bit (Tail) is added thereto. Thereafter, convolutional coding of a ⅓ rate, which is included into some of a spreading process, is performed. Since the error detecting process is completed for each frame, a structure applicable to packet transmission is adopted in the conventional example.

FIG. 2 is an explanatory view showing the insertion of pilot symbols, used for estimation of fading, into coded data (Coded Data) after having been interleaved in the conventional up-link transmission system shown in FIG. 1. In the drawing, (a) indicates the case in which a transmission rate (data rate) of transmit data is less than 32 kbps and (b) indicates the case in which the data rate is less than 128 kbps. As shown in FIG. 2, the transmit data or its sequence is divided into slots every 0.5 ms after the completion of bit interleaving. In the case of a 32(128) kbps code channel, 4(16)-bit pilots are inserted into the transmit data sequence, after which data modulation (QPSK) is performed (at this time, 2(8) pilot symbols corresponding to 2(8) symbols are provided). Hence spreading modulation is done by dual spreading codes. In the conventional example, an orthogonal gold sequence is used as a short spreading code and a gold sequence is used as a long spreading code. Further, BPSK (down-link) and OQPSK (up-link) are used for the spreading modulation.

FIG. 3 is an explanatory view showing the insertion of pilot symbols used in coherent multicode multiplex transmission in the conventional up-link transmission system shown in FIG. 1. In the drawing, (a) indicates the case in which a data rate is lower than a predetermined rate, e.g., 32(128) kbps, and (b) indicates the case in which the data rate is higher than 32(128) kbps. Upon the transmission of data at a fast rate (when the data rate is greater than 32/128 kbps), a transmission data sequence is subjected to error correction coding and bit interleaving and thereafter divided into a plurality of code channels, which in turn are respectively subjected to data modulation and spreading modulation separately. In this case, concatenated coding is applied in which convolutional codes each having a rate ⅓ are used as inner codes and Reed Solomon codes RS(40, 34) with one symbol as 8 bits are used as outer codes. Since a propagation path is common between all the code channels, each fading-estimated pilot symbol is inserted only into a first code channel in the case of an up-link as shown in FIG. 3.

The multicode multiplexed CDMA system typified by the up-link transmission system of the conventional coherent multicode DS-CDMA (Direct Sequence CDMA) above has a problem in that when the data rate of each transmit signal reaches high rates, it is difficult to maintain the linear characteristic of the power amplifier, with the result that the amount of interference in the adjacent frequency bands increases. Namely, in a communication device of a conventional multicode multiple CDMA system, the number of multicode multiplexings increases as the data rate of the transmitted signal increases, so that the degree of a envelope variation increases after the multiplexing. The power amplifier used for power amplification has a problem in that it normally performs power amplification faithfully with respect to an amplitude variation lying within a predetermined range (linear region). However when the width of the amplitude variation exceeds a limit, an input-to-output linear characteristic cannot be kept, so that distortion caused by a nonlinear characteristic results in an increase in the amount of interference with adjacent frequency bands.

The present invention has been made to solve the above problems. It is therefore an object of this invention to obtain a variable rate transmitting method capable of holding a linear characteristic of a power amplifier and providing high-quality data transmission in a simple hardware configuration, and a variable rate transmission apparatus using the variable rate transmission method.

DISCLOSURE OF THE INVENTION

An apparatus for variable rate transmission according to the present invention comprises means for transmission spreading modulation on data signals in a binary sequence using bi-orthogonal signals when a transmission rate of each data signal is greater than or equal to a predetermined transmission rate.

Owing to this arrangement, an advantageous effect is brought about in that even in the case of a fast data rate, a linear characteristic of a power amplifier can be maintained and high-quality data transmission can be implemented in a simple hardware configuration without giving interference to adjacent frequency bands.

The variable rate transmission apparatus according to the present invention further comprises signal processing means for effecting a series of signal processes such as an error correction coding process on the data signals, and a first serial/parallel converter for performing serial/parallel conversion on the output of the signal processing means. The means for transmitting spreading-modulated data signals in a binary sequence using bi-orthogonal signals spreading-modulates parallel output signals outputted from the first serial/parallel converter in a binary sequence using the bi-orthogonal signals and transmits the resultant signals therefrom.

Owing to this arrangement, an advantageous effect is brought about in that even in the case of a fast data rate, a linear characteristic of an output produced from a power amplifier can be maintained and high-quality data transmission can be implemented in a simple hardware configuration without giving interference to adjacent frequency bands.

The variable rate transmission apparatus according to the present invention further comprises a second serial/parallel converter for converting data signals into serial/parallel form, and signal processing means provided so as to correspond to the respective parallel data signals outputted from the second serial/parallel converter and for performing a series of signal processes such as predetermined error correction coding on the signals. The means for spreading modulation on the data signals in the binary sequence using bi-orthogonal signals and for transmission of the spreading-modulated signals spreading-modulates signals outputted from the signal processing means and transmits the resultant signals therefrom.

Owing to this arrangement, an advantageous effect is brought about in that even in the case of a fast data rate, a series of signal processing rates can be all achieved with the same rate and the hardware design can be easily carried out, and the linear characteristic of a power amplifier can be maintained and high-quality data transmission can be implemented in a simple hardware configuration without interfering with adjacent frequency bands.

The variable rate transmission apparatus according to the present invention is constructed such that the means for spreading-modulation on the data signals in the binary sequence using the bi-orthogonal signals and transmission for the spreading-modulated signals generated from the bi-orthogonal signals using Walsh functions.

Owing to this arrangement, an advantageous effect is brought about in that bi-orthogonal signals are easily generated, transmitted and detected, and high-quality data transmission can be carried out.

A variable rate transmission method according to the present invention is constructed such that when a transmission rate of each data signal is greater than or equal to a predetermined transmission rate, data signals are spreading-modulated in a binary sequence by using bi-orthogonal signals and are transmitted.

Owing to this arrangement, an advantageous effect is brought about in that even in the case of a fast data rate, a linear characteristic of a power amplifier can be held and high-quality data transmission can be implemented without giving interference to adjacent frequency bands.

The variable rate transmission method according to the present invention is constructed such that Walsh functions are used to obtain bi-orthogonal signals.

Owing to such an arrangement, an advantageous effect is brought about in that bi-orthogonal signals can be easily generated, transmitted and detected.

BRIEF DESCRIPTION OF DRAWINGS

FIG. 2 is an explanatory view illustrating the insertion of pilots after having been interleaved in the conventional up-link transmission system shown in FIG. 1;

FIG. 3 is an explanatory view depicting the insertion of pilot symbols under coherent multicode multiplex transmission in the conventional up-link transmission system shown in FIG. 1;

FIG. 11 is a block diagram illustrating the details of the bi-orthogonal signal generator unit shown in FIG. 5;

BEST MODE FOR CARRYING OUT THE INVENTION

Best modes for carrying out the present invention will hereinafter be described in accordance with the accompanying drawings to explain the present invention in more detail.

Embodiment 1

Figure 1:
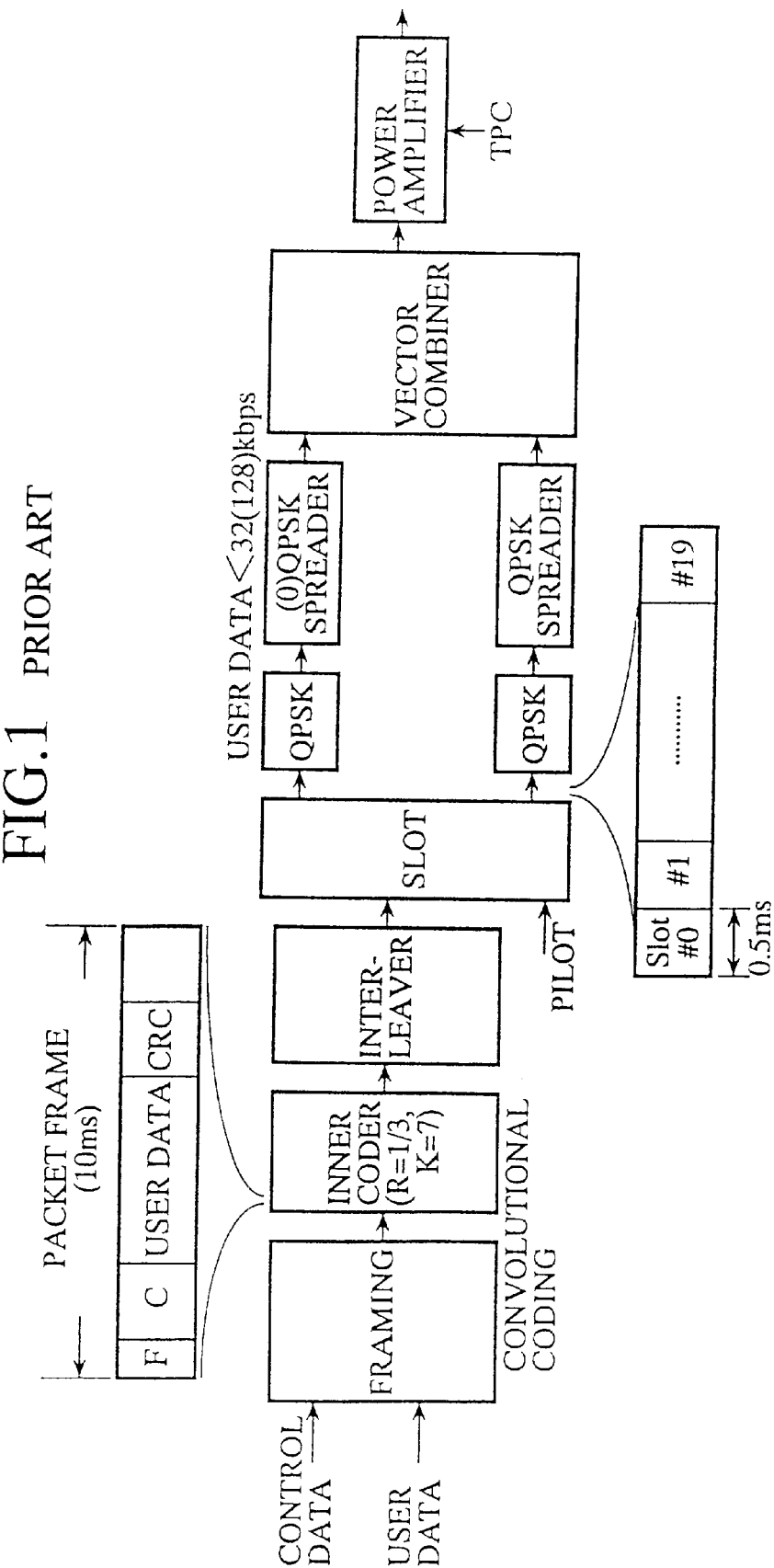
FIG. 1 is a block diagram showing an up-link transmission system employed in a conventional coherent multicode DS-CDMA.
Figure 4:
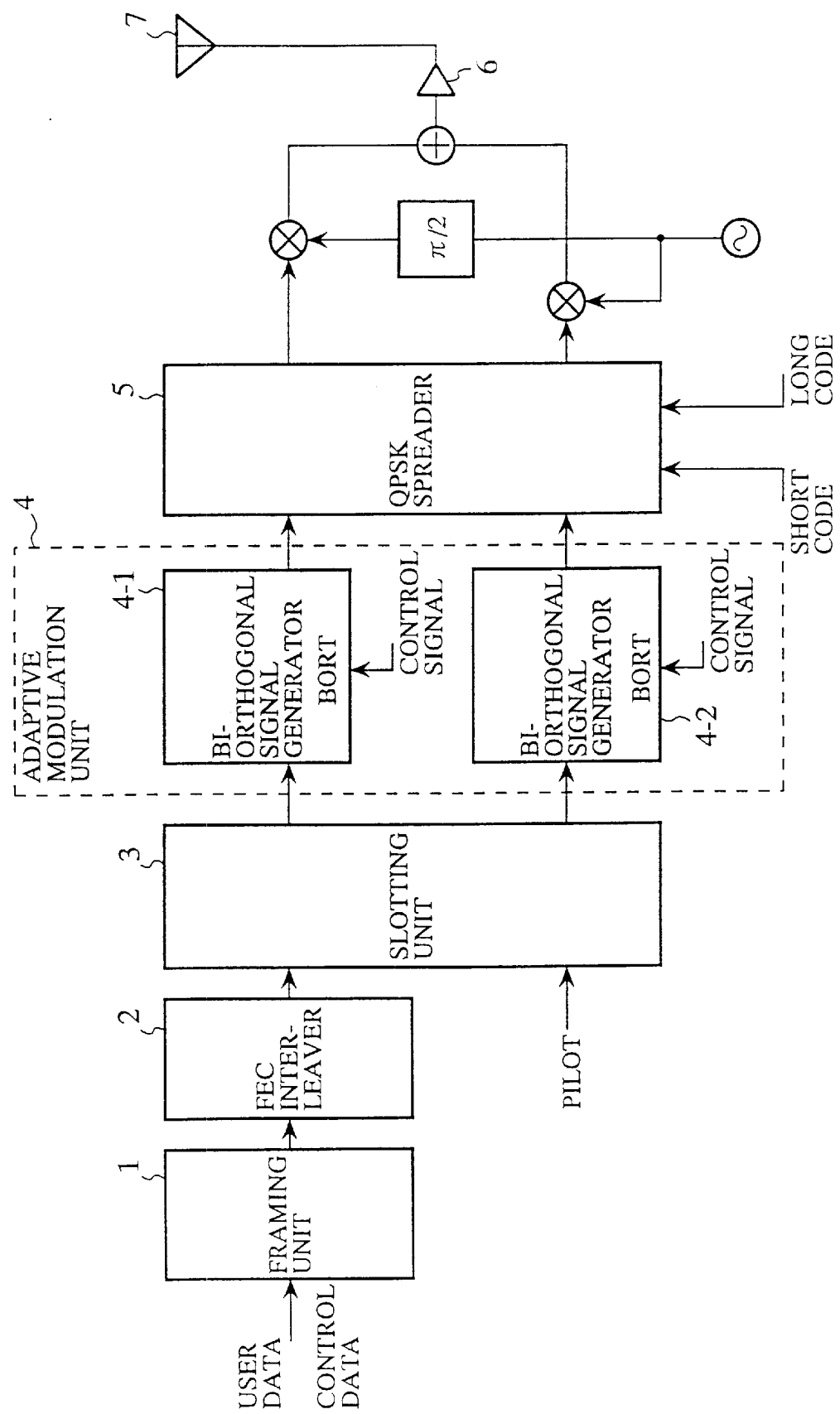
FIG. 4 is a block diagram showing a variable rate transmission apparatus according to an embodiment 1 of the present invention.

FIG. 4 is a block diagram showing a variable rate transmission apparatus according to an embodiment 1 of the present invention. In the drawing, reference numeral 1 indicates a framing unit for inputting user data and control data therein and converting them into frame form, reference numeral 2 indicates an FEC (Forward Error Correction: Error Correction Coding) and interleaver (signal processing means), reference numeral 3 indicates a slotting unit (signal processing means), and reference numeral 4 indicates an adaptive modulation unit (means for spreading-modulation on data signals in a binary sequence using bi-orthogonal signals and transmitting the so-processed signals), which includes, for example, a plurality of bi-orthogonal signal (Bi-Orthogonal signal: BORT) generator units 4-1 and 4-2 for respectively generating bi-orthogonal signals, based on Walsh functions, for example, respectively. Reference numeral 5 indicates a QPSK (Quarternary Phase-Shift Keying: QPSK) spreader, reference numeral 6 indicates a power amplifier, and reference numeral 7 indicates an antenna, respectively.

Figure 5:
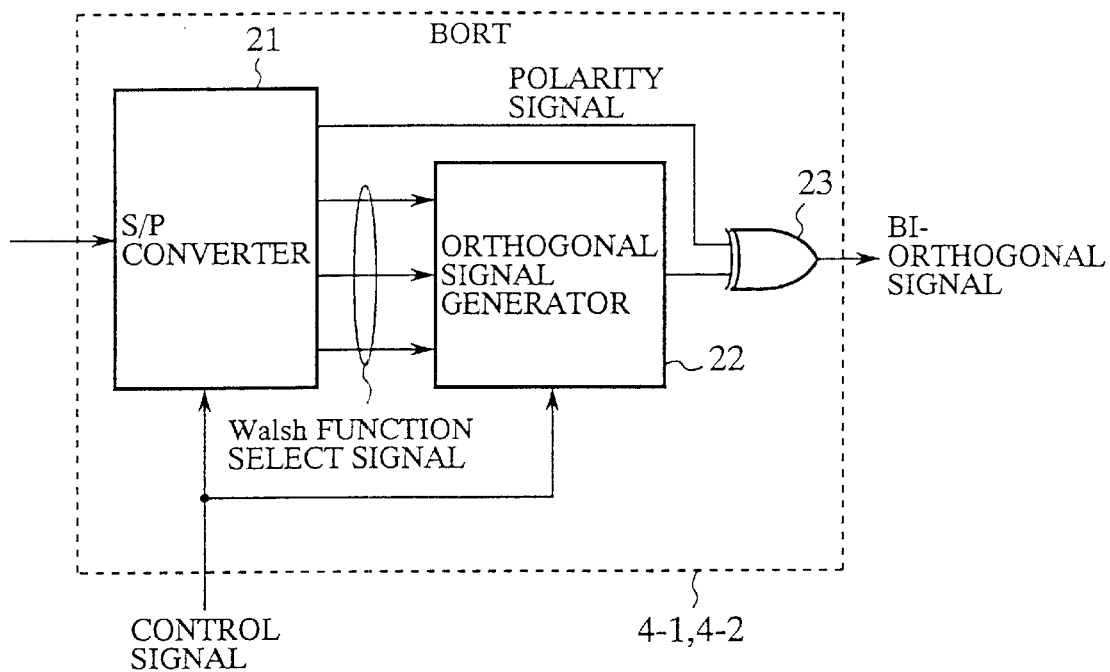
FIG. 5 is a block diagram illustrating a bi-orthogonal signal generator unit employed in the variable rate transmission apparatus according to the embodiment 1 shown in FIG. 4.

FIG. 5 is a block diagram showing each of the bi-orthogonal signal generator units 4-1 and 4-2 which constitute the adaptive modulation unit 4 employed in the variable rate transmission apparatus according to the embodiment 1 shown in FIG. 4. In the drawing, reference numeral 21 indicates a serial/parallel converter (hereinafter called "S/P converter": first serial/parallel converter), and reference numeral 22 indicates an orthogonal signal generator for selecting a Walsh function sequence in accordance with a control signal and selecting and generating an orthogonal signal according to input data, respectively. Reference numeral 23 indicates an EXOR (Exclusive OR) circuit for determining the polarity of the orthogonal signal.

Figure 6:
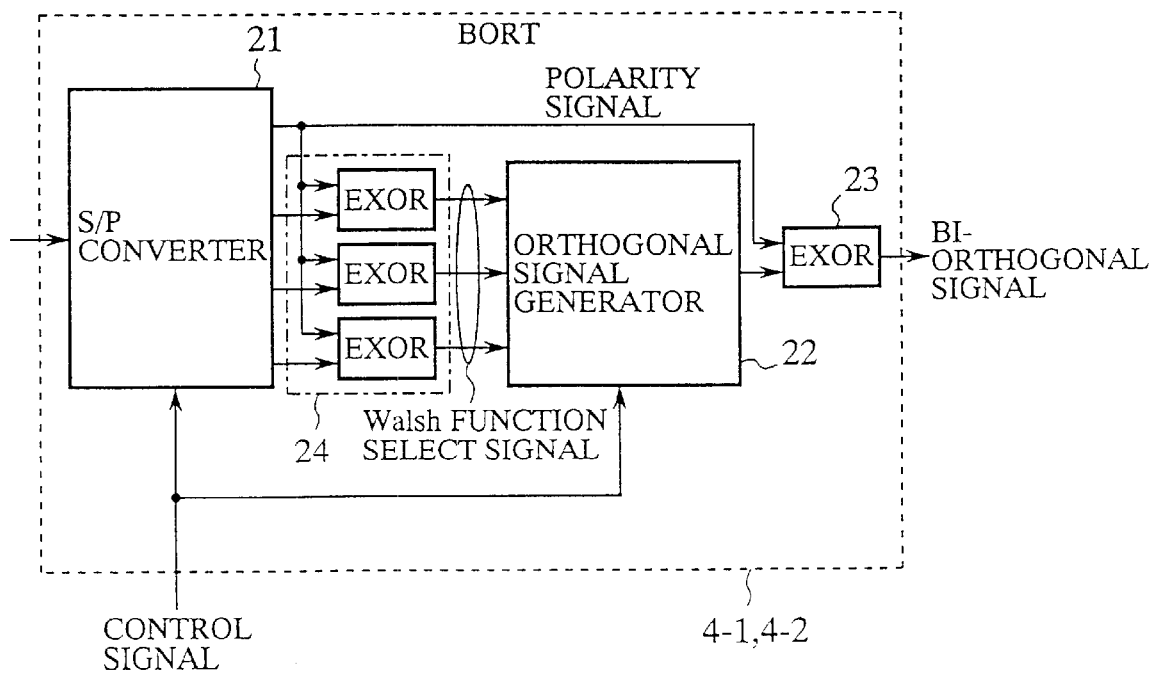
FIG. 6 is a block diagram depicting another bi-orthogonal signal generator unit employed in the variable rate transmission apparatus according to the embodiment 1 shown in FIG. 4.

FIG. 6 is a block diagram showing other bi-orthogonal signal generator units 4-1 and 4-2 which constitute the adaptive modulation unit 4 employed in the variable rate transmission apparatus according to the embodiment 1 shown in FIG. 4. FIG. 6 is different from FIG. 5 in that a symbol mapping part 24 exists between the first S/P converter 21 and the orthogonal signal generator 22. The symbol mapping part 24 works to enhance the mapping between input data and bi-orthogonal signals. As a result, a transmission characteristic can be improved.

Figure 7:
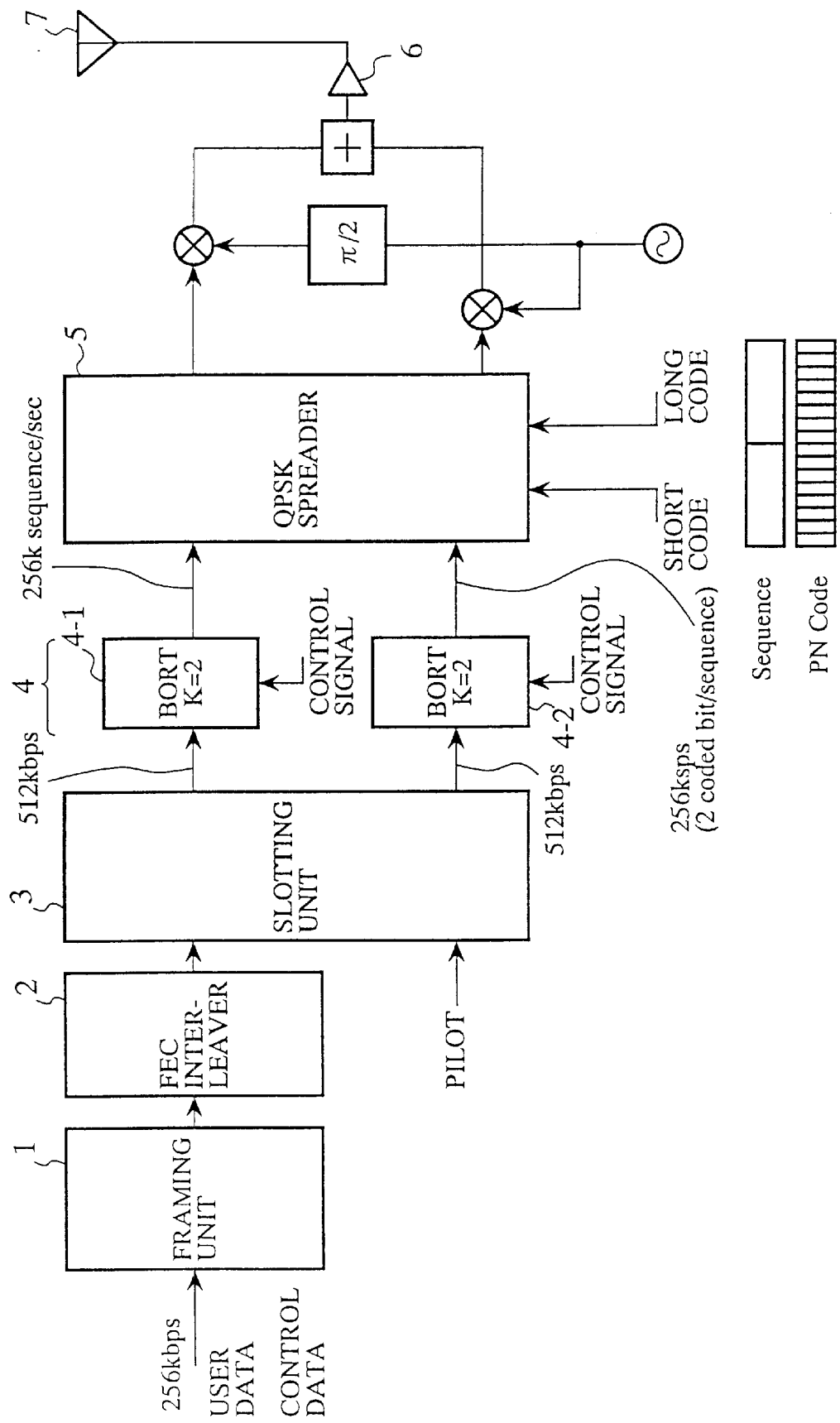
FIG. 7 is a block diagram showing the variable rate transmission apparatus at the time that a data rate of each input signal is equal to 256 kbps (K=2)
Figure 8:
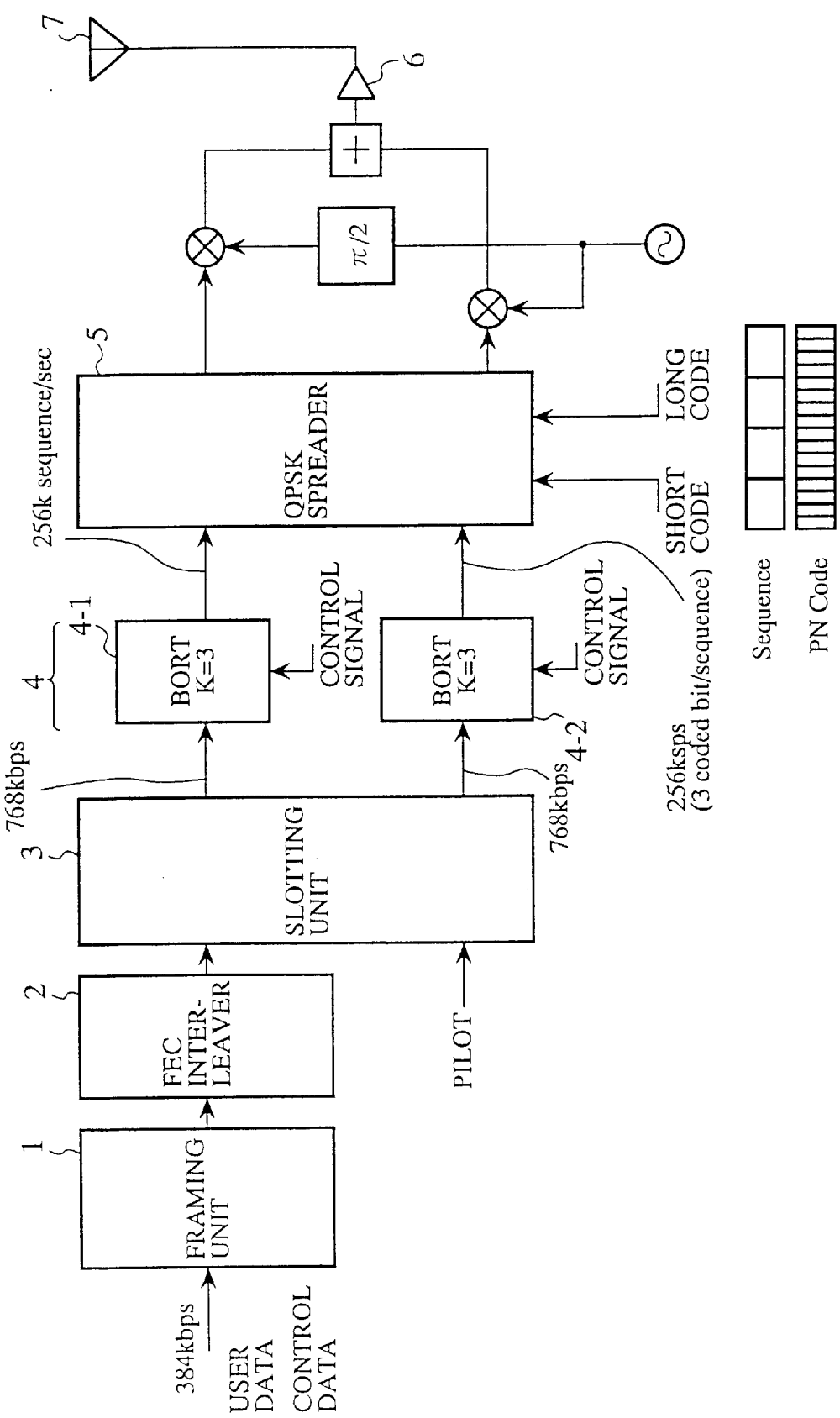
FIG. 8 is a block diagram illustrating the variable rate transmission apparatus at the time that the data rate of each input signal is equal to 384 kbps (K=3)
Figure 9:
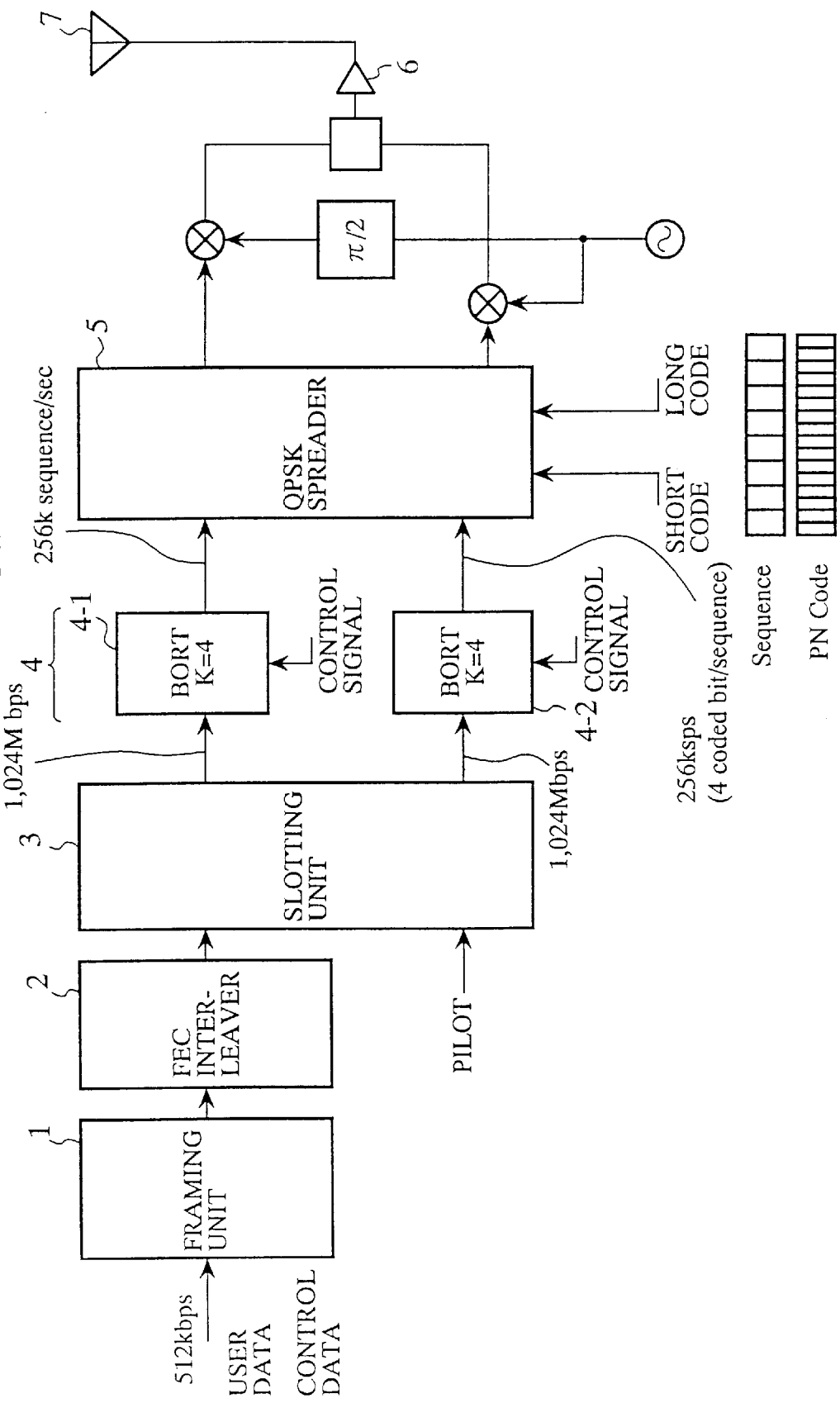
FIG. 9 is a block diagram depicting the variable rate transmission apparatus at the time that the data rate of each input signal is equal to 512 kbps (K=4)
Figure 10:
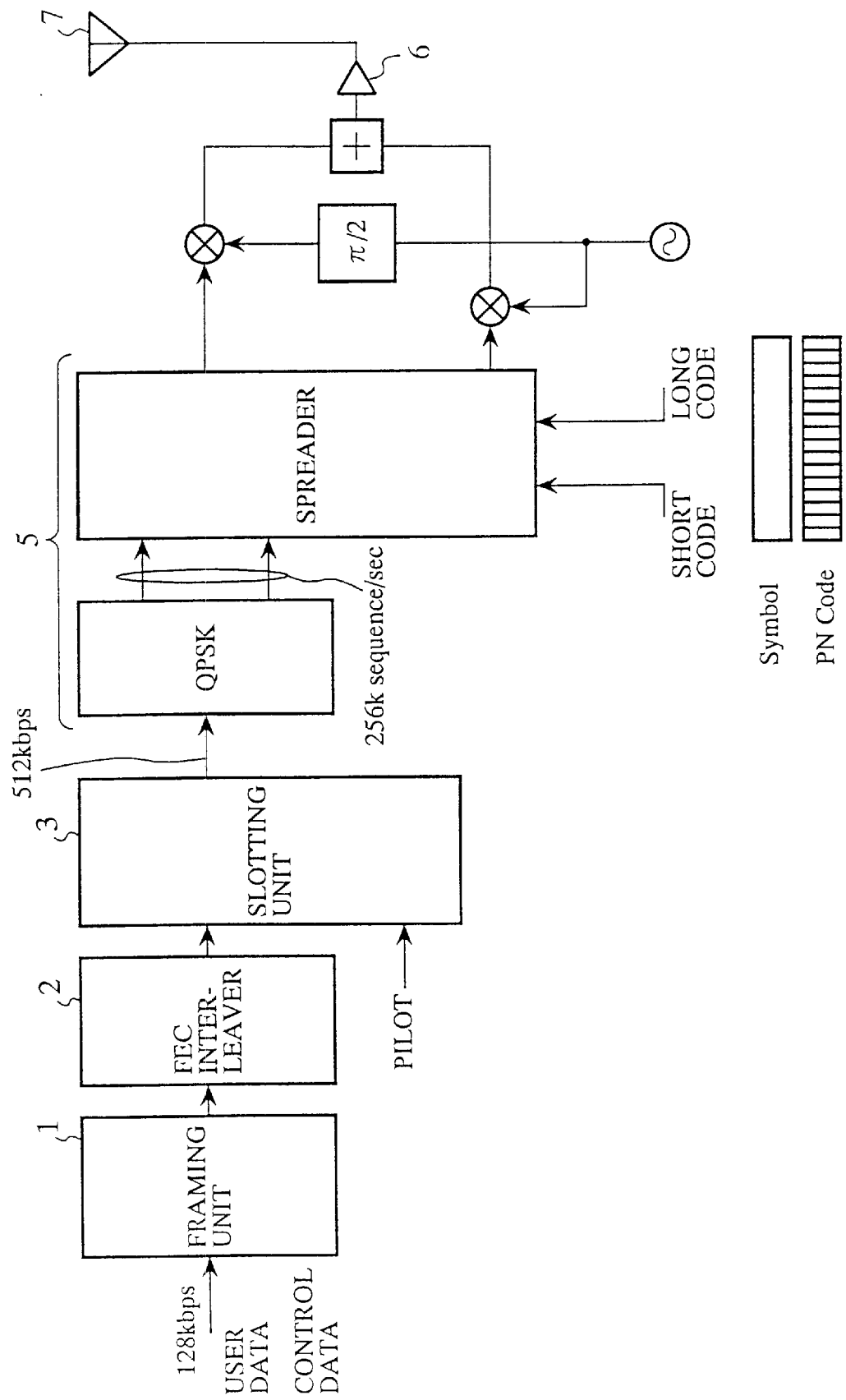
FIG. 10 is a block diagram showing the variable rate transmission apparatus at the time that the data rate of each input signal is equal to 128 kbps.

FIG. 7 is a block diagram showing a variable rate transmission apparatus at the time that a data rate of each input signal is given as 256 kbps (K=2), FIG. 8 is a block diagram illustrating a variable rate transmission apparatus at the time that the data rate of each input signal is equal to 384 kbps (k=3), FIG. 9 is a block diagram depicting a variable rate transmission apparatus at the time that the data rate of each input signal is equal to 512 kbps (k=4), and FIG. 10 is a block diagram showing the variable rate transmission apparatus at the time that the data rate of each input signal is equal to 128 kbps (k=1), respectively. They respectively show equivalent circuits at the respective data rates, of the variable rate transmission apparatus according to the embodiment 1. Here, K indicates the number of coded bits (coded data) included in each bi-orthogonal signal.

FIG. 11 is a block diagram showing the details (when K=4) of the bi-orthogonal signal generator units 4-1 and 4-2 shown in FIG. 5. In FIG. 11, FIG. 11(a) is a block diagram illustrating the adaptive modulation units 4-1 and 4-2 shown in FIG. 5, FIG. 11(b) is an explanatory view showing the relationship between input information data inputted to the bi-orthogonal signal generator units 4-1 and 4-2 and output data indicative of bi-orthogonal signals, and FIG. 11(c) is a block diagram depicting the details of the bi-orthogonal signal generator units 4-1 and 4-2 respectively shown in FIG. 5. In the drawing, reference numerals 221 through 223 indicate a logical product circuit (hereinafter called "AND circuit") respectively, and reference numeral 224 indicates an EXOR circuit.

The variable rate transmission apparatus according to the embodiment 1, which is shown in FIGS. 4 through 11, is a variable rate transmission apparatus for spreading-modulating data signals by using a spreading coded sequence and transmitting the resultant signals therefrom, and transmits data signals by using bi-orthogonal signals. When the transmission rate of the data signal is equal to a rate exceeding a predetermined transmission rate (e.g., 128 kbps), the respective bi-orthogonal signal generator units 4-1 and 4-2 in the adaptive modulation unit 4 convert coded data into bi-orthogonal signals in, which Walsh functions have polarities. The resultant outputs are spreading-modulated by the QPSK spreader. Namely, since bi-orthogonal signals represented in a binary sequence serve so as to transmit a plurality of coded data, data transmission is performed efficiently without envelope variation which results in the case of multi-code multiplexing.

The operation will next be described.

First of all, the framing unit 1 employed in the variable rate transmission apparatus according to the embodiment 1 shown in FIG. 4 inputs user data and control data each having a predetermined data transmission rate and outputs them so as to be delimited at predetermined frame times. The predetermined data transmission rate may include, for example, 2.4, 4.8, 9.6, 14.4, 16, 19.2, 32, 64, 128, 384, 2048 kbps, etc. Embodiment 1 is characterized in that when the data rate exceeds 128 kbps, the data signals are spread and modulated in the binary sequential state by using bi-orthogonal signals and the data transmission is executed efficiently.

The FEC interleaver 2 performs error correction coding and interleaving on the user data and control data outputted from the framing unit 1. Here, convolutional coding is used for each frame. After the interleave processing has been executed by the FEC interleaver 2, the slotting unit 3 divides data into slots produced in every predetermined period and inserts pilots into them. Since the framing unit 1, FEC interleaver 2 and slotting unit 3 are similar to the conventional ones in function and configuration, their description will not be described here.

The slots with the pilots inserted therein are inputted to the adaptive modulation unit 4. The adaptive modulation unit 4 selects a Walsh function sequence in accordance with each control signal according to each of data transmission rates of data whose data transmission rates exceed 128 kbps, selects a Walsh function in response to input coded data, and outputs a bi-orthogonal signal obtained after a polarity operation is executed by each EXOR. Namely, the control signal serves so as to select K (the number of coded bits) according to data. The function and configuration of the adaptive modulation unit 4 will be described later in detail.

The QPSK spreader 5 inputs therein dual bi-orthogonal signals having a plurality of coded data information, which are outputted from the adaptive modulation unit 4 and performs QPSK spreading-modulation on them using short and long codes. Since the QPSK spreader 5 is similar to the conventional one in function and configuration, its description will not be described here. The signals QPSK spreading-modulated by the QPSK spreader 5 are subjected to QPSK carrier-modulation using orthogonal carrier waves, after which they are amplified by the power amplifier 6, followed by transmission to the antenna 7.

FIG. 7 is a block diagram showing the variable rate transmission apparatus at the time that the data transmission rate of each input signal is 256 kbps (k=2). When the transmission rate of each data sent from the slotting unit 3 is 256 kbps, the S/P converter 21 and orthogonal signal generator 22 provided within the bi-orthogonal signal generator units 4-1 and 4-2 divide input data into two parallel signals and output the signals. One of them selects either one of W2(0) and W2(1) as a Walsh function to generate a bi-orthogonal signal. The resultant orthogonal signal and a polarity signal outputted from the other of them are inputted to the EXOR circuit 23 from which a bi-orthogonal signal is outputted.

FIG. 8 is a block diagram showing the variable rate transmission apparatus at the time that the data rate of each input signal is 384 kbps (k=3). When the data rate is 384 kbps, the S/P converter 21 and orthogonal signal generator 22 provided within the bi-orthogonal signal generator units 4-1 and 4-2 output dual input data outputted from the slotting unit 3 as three parallel signals respectively and select any one of W4(0) through W4(3) as a Walsh function in two bits to generate a bi-orthogonal signal. The resultant orthogonal signal and a polarity signal given in another one bit are inputted to the EXOR circuit 23 from which a bi-orthogonal signal is outputted.

FIG. 9 is a block diagram showing the variable rate transmission apparatus at the time that the data rate of each input signal is 512 kbps (k=4). When the data rate is 512 kbps, the S/P converter 21 and orthogonal signal generator 22 provided within each of the bi-orthogonal signal generator units 4-1 and 4-2 divide dual input data outputted from the slotting unit 3 into four parallel signals and output them, and select any one of W8(0) through W8(7) as a Walsh function in three bits to generate a bi-orthogonal signal. The resultant orthogonal signal and a polarity signal given in another one bit are inputted to the EXOR circuit 23 from which a bi-orthogonal signal is outputted.

FIG. 10 is a block diagram showing the variable rate transmission apparatus at the time that the data rate of each input signal is 128 kbps (k=1). Below this data rate, no bi-orthogonal signal is produced and the data transmission is intermittently performed using the conventional burst transmission. Since the configuration and operation in this case are identical to the conventional one, their description will not be described. However, when the control signal indicates that the data rate of each input signal is 128 kbps (k=1), the S/P converter 21 allows each input signal to pass therethrough without performing any operation in the configuration of the bi-orthogonal signal generator units 4-1 and 4-2 as shown in FIG. 5. Namely, when the data rate is less than 128 kbps, each of the bi-orthogonal signal generator units 4-1 and 4-2 is constructed so that serial/parallel conversion is not performed within the S/P converter 21 and the output of the orthogonal signal generator 22 is always set to a low level. As a result, the configuration of the variable rate transmission apparatus can be set to the same configuration as when the data rates of the input signals shown in FIGS. 7 through 9 are respectively 256 kbps (k=2), 384 kbps (k=3) and 512 kbps (k=4).

A description will next be made of the operations of the bi-orthogonal signal generator units 4-1 and 4-2 constituting the adaptive modulation unit 4 employed in the variable rate transmission apparatus and the variable rate transmitting method according to the embodiment 1. The respective operations of the bi-orthogonal signal generator units 4-1 and 4-2 constituting the adaptive modulation unit 4 will be explained below with respect to the case when the data rate of each input signal is 512 kbps (k=4), i.e., the input data is represented in the form of four input bits (d0 through d3) and one-sequential bi-orthogonal signal is generated. Since other cases are basically identical in operation to the following description, the description thereof will not be described.

The data inputted to the respective bi-orthogonal signal generator units 4-1 and 4-2 in the adaptive modulation unit 4 are first converted into 4-bit parallel data (d0, d1, d2 and d3) by the S/P converters 21 respectively. Next, each of the orthogonal signal generators 22 generates one orthogonal signal selected from orthogonal codes indicative of eight ($=2^{K-1}$) orthogonal signals according to 3 (k=1) bit data (d0, d1 and d2) of the 4-bit parallel data, based on the value (=K) of the control signal.

The EXOR circuit 23 performs a multiplying process between the orthogonal signal obtained from the orthogonal signal generator 22 and the remaining 1-bit data (d3) of the 4-bit parallel data to execute a polarity operation, thereby generating a bi-orthogonal signal and thereafter outputting it to the outside.

In the variable rate transmission method and variable rate transmission apparatus according to the embodiment 1, Walsh function coded sequences are used to obtain orthogonal signals. In this case, Walsh function sequences W8(n) (where n=0 to 7) shown in FIG. 11(b) are outputted as orthogonal signals, based on the 4-bit parallel data d0 through d3. Namely, since one function sequence can be selected from the values of the three bits (d0, d1 and d2) in the 4-bit parallel data, eight kinds of Walsh function sequences whose each sequence length is represented as 8, are produced. Reference numeral W8 indicates a Walsh function whose sequential length is 8. Numerals 0 through 7 inside the parentheses indicate function numbers. Each Walsh function sequence selected as an orthogonal signal is inverted or non-inverted in accordance with the value of the remaining 1-bit data (d3) of the 4-bit parallel data, and the result thereof is outputted as a bi-orthogonal signal. Thus, the bi-orthogonal signal comprises a coded sequence whose sequence length is 8 and includes 4-bit information.

Incidentally, the inversion and non-inversion of each digital value is performed by an exclusive OR gate in the case of binary representation in the form of 0 and 1 and carried out by a multiplier in the case of +1 and −1. In the present embodiment, the inversion and non-inversion of each digital value will be described using the binary representation of 0 and 1. In the following description, the duration from the beginning of the Walsh function sequence to the end thereof will be called a "cycle", the interval between codes constituting the Walsh function will be called a "code interval", and the inverse of the code interval will be referred to as a "code rate".

When the Walsh function is used as the orthogonal signal, an orthogonal signal generator 22 shown in FIG. 11(c) comprises AND circuits 221 through 223 for taking AND logic between clocks 225, 226 and 227 respectively having rates of ½, ¼ and ⅛ of the code rate (=1/Tmc, Tmc: code interval) with input data d0, d1 and d2, and an EXOR circuit 224 for XORing the outputs of the three AND circuits 221 through 223. The clocks for the code rate are essential to the configuration of hardware. The clocks respectively having rates ½, ¼ and ⅛ of the code rate are basic clocks produced by a divider circuit such as a counter or the like.

The orthogonal signal generator 22 can selectively choose a Walsh function so as to generate an orthogonal signal. The Walsh functions are defined as row vectors of a Hadamard matrix H (N) with $2^K$ rows×$2^K$ columns and are expanded by increasing the degrees from [H(N/2), H(N/2)] obtained by repeating a Hadamard matrix H (N/2) with $2^{K-1}$ rows×$2^{K-1}$ columns and [H(N/2), H* (N/2)] obtained by inverting and repeating the Hadamard matrix. Here, symbol * indicates an inverted matrix.

H1 is used as the reference. A first row is represented as [0, 0] and a second row is represented as [0, 1], and they correspond to W2(0) and W2(1) respectively. H2 are created as [H1, H1] and [H1, H*1] from H1. As a result, four row vectors of [0000], [0101], [0011] and [0110] are obtained and correspond to W4(0) through W4(3) respectively. W8(0) through W8(7), created by a method similar to the above, are illustrated in FIG. 11(b). When W8(0) and W8(1), W8(2) and W8(3), W8(4) and W8(5), and W8(6) and W8(7) are compared with one another, odd-numbered bits as viewed from the least significant bit and the immediately following even-numbered bits are classified as similar or inverted.

Similar ones include W8(0), W8(2), W8(4) and W8(6), whereas inverted ones include W8(i), W8(3), W8(5) and W8(7). The decision as to whether they are similar or inverted, corresponds to the value of the least significant bit d0 of the data shown in FIG. 11(b). Namely, if the least significant bit d0 is 0, then they are regarded as the same. If the least significant bit d0 is 1, then they are regarded as inverted. Inversion for each bit is implemented by the clock 225 having a rate equal to one-half the code rate. Whether this should be adopted, depends on the least significant bit d0 and is implemented through the AND circuit 221 used as the logical product circuit.

When W8(0) through W8(7) are divided into four pairs by 2 bits from the least significant bit, W8(0) and W8(2), W8(1) and W8(3), W8(4) and W8(6), and W8(5) and W8(7) are respectively compared with one another. As a result, W8(0), W8(1), W8(4) and W8(5) are identical as regards double bit and repeated, whereas in the case of W8(2), W8(3), W8(6), and W8(7), respective double bits are inverted and repeated. A decision as to whether the bits are the same or inverted, corresponds to the value of the second bit d1 of the data shown in FIG. 11(b). Namely, if the second bit d1 is 0, then they are regarded as the same. If the second bit d1 is 1, then they are regarded as inverted. Inversion in 2-bit units is implemented by the clock 226 having a rate equal to one-fourth the code rate. Whether this should be adopted, depends on the second bit d1 and is achieved through the AND circuit 222 which corresponds to the logical product circuit.

Whether sequences set by 4 bits from the least significant bit are the same and continuous or inverted and continuous, is associated with the polarity of the third bit d2. Inversion of the sequences set every 4 bits is implemented by the clock 227 having the rate equal to one-eighth the code rate. Whether this should be adopted, is dependent on the third bit d2 and is achieved through the AND circuit 223 which corresponds to the logical product circuit.

When the inversion or non-inversion results in three bit intervals are caused to pass through the EXOR circuit 224, a sequence containing the results is obtained as a Walsh function. Thus, each Walsh function sequence, which depends on the input data bit d0, d1 and d2, i.e., which is selected from d0, d1 and d2, is outputted as an orthogonal signal from the EXOR circuit 224.

Thus, since the orthogonal signal generator 22 can generate specific orthogonal signals only by the simple generating mechanism of the clocks and the input data, a transmitter having the function of being capable of maintaining a linear characteristic of a power amplifier in a simple hardware configuration can be implemented if this is incorporated therein. Further, since each orthogonal signal is easy to produce, the generation of the bi-orthogonal signal from each of the bi-orthogonal signal generator units 4-1 and 4-2 can be easily implemented. While a receiver needs the operation of demodulating each bi-orthogonal signal, fast Hadamard transformer (Fast Hadamard Transformer: FHT) is performed where the Walsh function is used as the orthogonal signal on the transmitter side. Thus, since the demodulating process can be easily executed, the receiver can be constructed in a simple hardware configuration and hence the demodulating process can be easily carried out.

Figure 12:
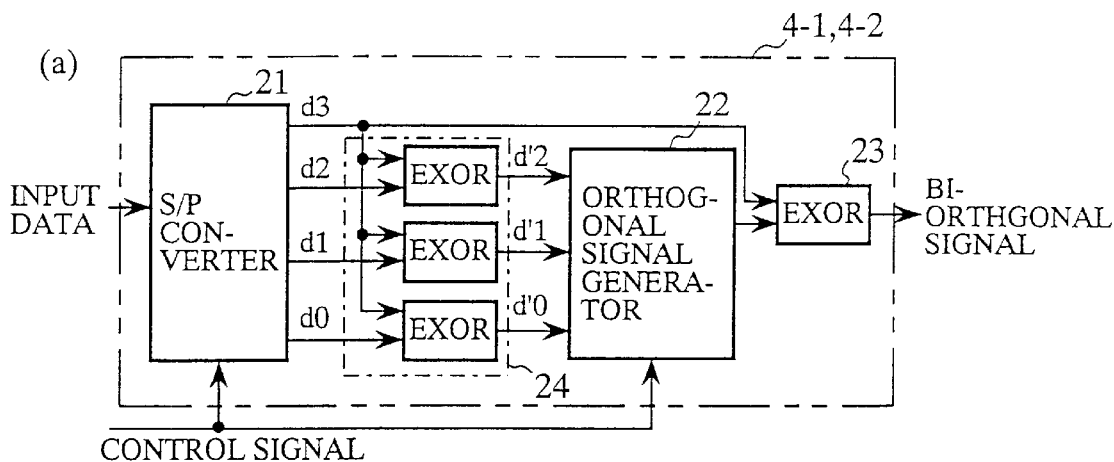
FIG. 12 is a block diagram depicting the details of the bi-orthogonal signal generator unit shown in FIG. 6.

The operation of each bi-orthogonal signal generator unit configured so as to have the symbol mapping part 24 as shown in FIG. 6 will be explained using FIG. 12. As shown in FIG. 12(a), the symbol mapping part 24 performs EXOR logic between a polarity bit d3 and other input data d0, d1 and d2 and thereafter inputs the EXOR-computed data to an orthogonal signal generator 22. As a result, d'0, d'2 and d'3 are inputted to the orthogonal signal generator 22. The relationship between the input data d0, d1, d2 and d3 and the bi-orthogonal signals is shown in FIG. 12(b). Symbol mapping in this case means that the input bits having inversion relation to one another are assigned to the bi-orthogonal signals identical in orthogonal function to each other and different in polarity from each other. Namely, (0, 0, 0, 0) and (1, 1, 1, 1) respectively indicative of (d0, d1, d2, d3) are assigned to W8(0) and −W8(0) respectively. Similarly, (0, 0, 0, 1) and (1, 1, 1, 0) are respectively assigned to W8(1) and −W8(1). Since the distance between the bi-orthogonal signals identical in orthogonal function to each other and different in code from each other is greater than the signal distance between the orthogonal functions, the probability that an error will take place between the signals identical in orthogonal function to each other and different in polarity from each other, is minimized. Namely, the probability that all the bits will be mistakenly demodulated upon demodulation, can be minimized by performing such mapping.

Although the orthogonal signal generator 22 for selecting and outputting each Walsh function as the orthogonal signal is used to obtain each bi-orthogonal signal in the above-described examples, the variable rate transmission apparatus and variable rate transmission apparatus according to the present invention are not limited to this. For example, an orthogonal gold signal sequence or the like may be used as the orthogonal function in place of the Walsh function.

According to the embodiment 1 as described above, after a series of signal processes such as error correction coding, etc. has been carried out, serial/parallel transformation is performed on fast data exceeding a predetermined data rate so as to convert it to a bi-orthogonal signal. It is then transmitted, as it is, in a binary sequence. Namely, since data signals are spreading-modulated and transmitted in a binary sequence by using the bi-orthogonal signals in the case of the transmission of each signal at a data rate exceeding a basic rate, the linear characteristic of the power amplifier 6 can be maintained even in the case of a fast data rate. Further, no interference is given to adjacent frequency bands and high-quality data transmission can be performed. Since Walsh functions are used, hardware configuration is easy and a demodulating process can be also implemented in a simple configuration. Since the bi-orthogonal signal transmission is excellent as regards error-rate characteristics, data error-rate characteristics can be improved and higher-quality data transmission can be achieved.

Embodiment 2

The variable rate transmitting method and variable rate transmission apparatus according to the embodiment 1 shown in FIGS. 4 through 11 show the case in which after a series of signal processes such as error correction coding, etc. has been carried out, serial/parallel transformation is performed to generate each bi-orthogonal signal, and thereafter a plurality of signal sequences are transmitted. However, a method is also considered wherein when a signal transmitting process at a fast rate is performed, a series of signal processes such as error correction coding, etc. is performed after the serial/parallel transformation is first carried out. A description will be made of a case in which in a variable rate transmitting method and a variable rate transmission apparatus according to an embodiment 2 to be described below. A series of signal processes such as error correction coding, etc. is performed after each input signal given at a fast data rate is first transformed into serial/parallel form, to thereby generate each bi-orthogonal signal without using a multicode. Hence fast data is transmitted while remaining held in a binary sequence.

Figure 13:
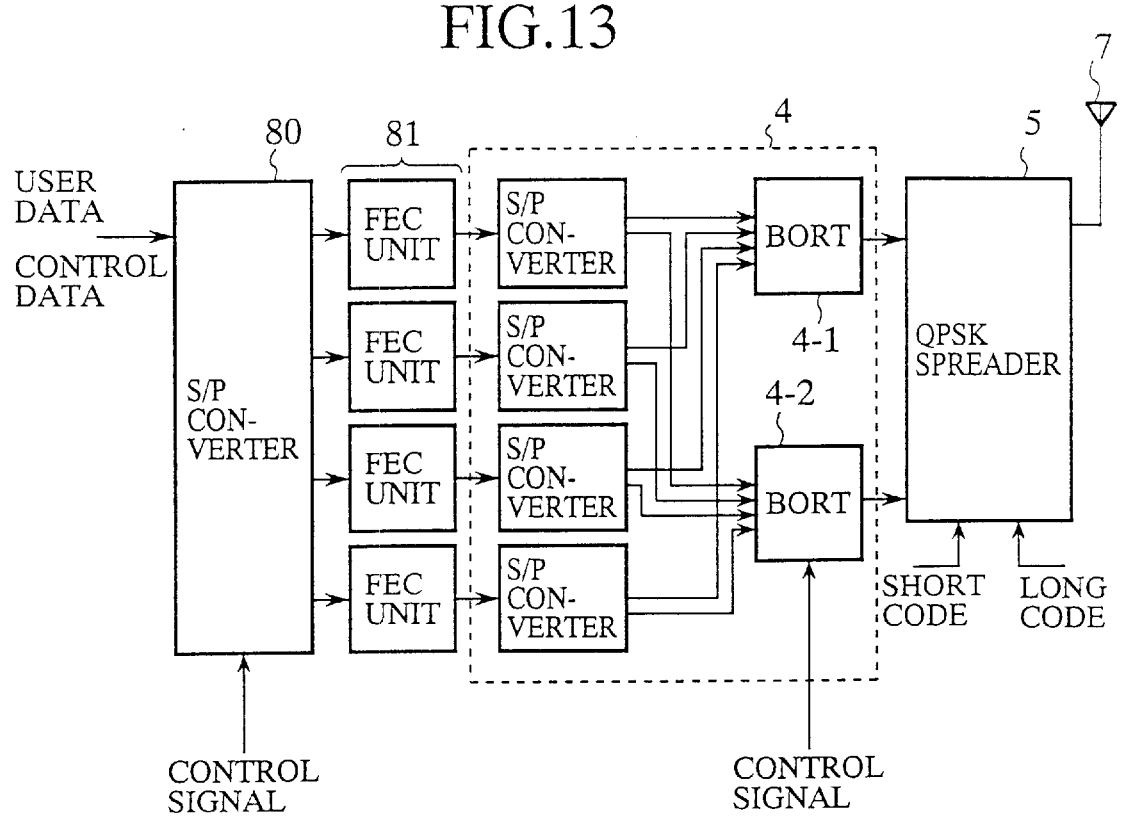
FIG. 13 is a block diagram showing a variable rate transmission apparatus according to an embodiment 2 of the present invention.
Figure 14:
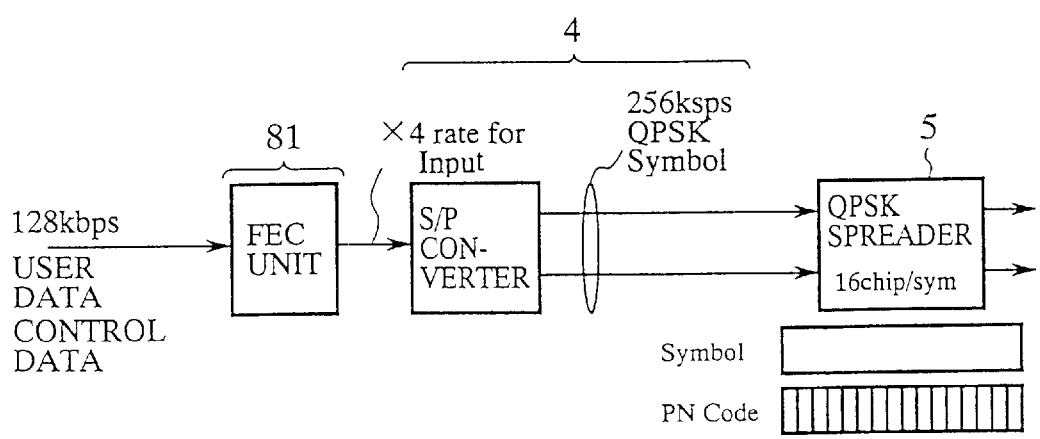
FIG. 14 is a block diagram illustrating a configuration of the variable rate transmission apparatus shown in FIG. 13 at the time that a data rate of each input signal is equal to 128 kbps.
Figure 15:
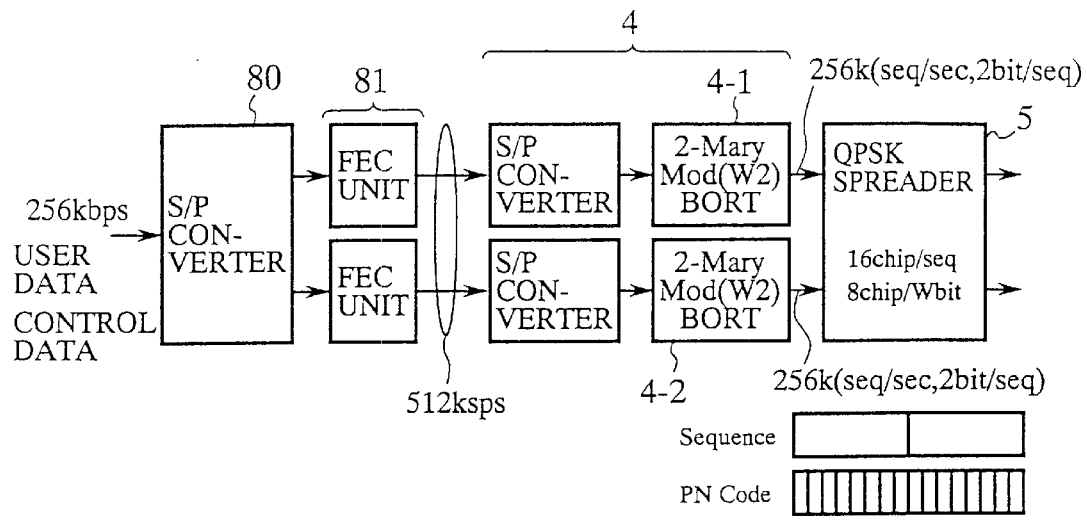
FIG. 15 is a block diagram depicting a configuration of the variable rate transmission apparatus shown in FIG. 13 at the time that the data rate of each input signal is equal to 256 kbps.
Figure 16:
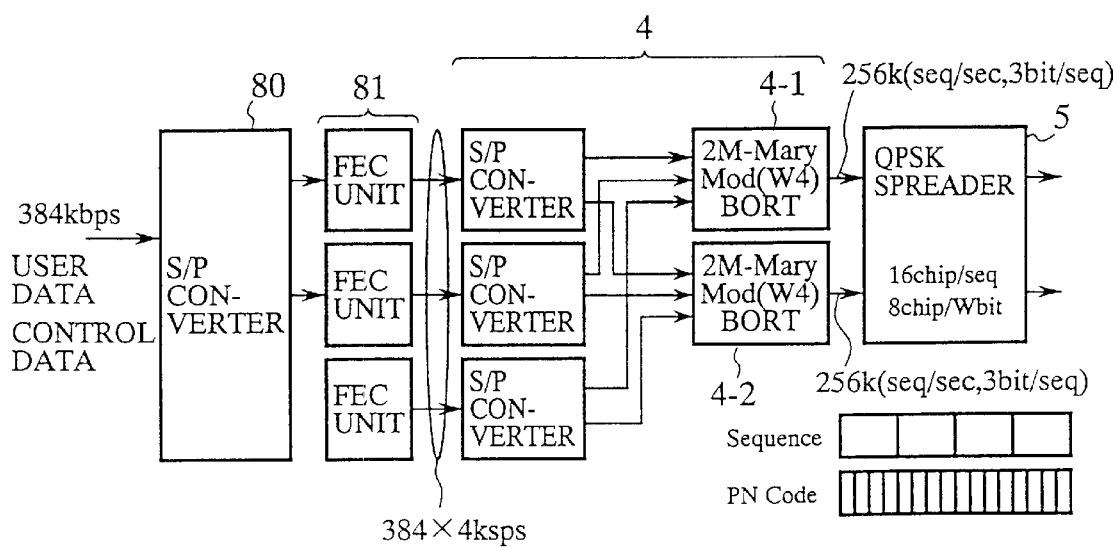
FIG. 16 is a block diagram showing a configuration of the variable rate transmission apparatus shown in FIG. 13 at the time that the data rate of each input signal is equal to 384 kbps.
Figure 17:
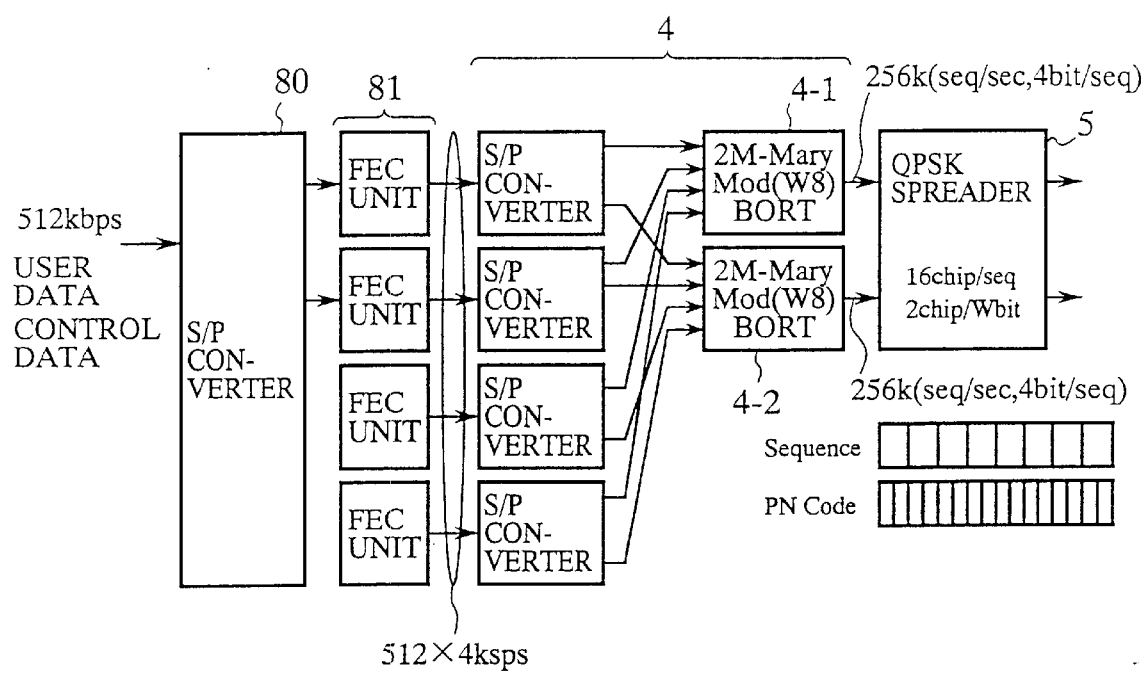
FIG. 17 is a block diagram illustrating a configuration of the variable rate transmission apparatus shown in FIG. 13 at the time that the data rate of each input signal is equal to 512 kbps.

FIG. 13 is a block diagram showing the variable rate transmission apparatus according to the embodiment 2 of the present invention. In the drawing, reference numeral 80 indicates a serial/parallel converter (hereinafter called "S/P converter": second S/P converter) which converts data signals of user data and control data into a plurality of parallel signals. Reference numeral 81 indicates each forward error correcting unit (Forward Error Correcting Unit: FEC unit, signal processing means), which performs a series of processes such as an error correction coding (convolutional coding) process, an interleaving process and a framing process with the insertion of pilot symbols and CRC therein, etc. Reference numeral 4 indicates an adaptive modulation unit and reference numeral 5 indicates a QPSK spreader. Since these are identical to those employed in the variable rate transmission apparatus according to the embodiment 1 shown in FIGS. 4 through 10, they are identified by the same reference numerals and their description will not be described again.

FIGS. 14 through 17 show the case in which data rates of input signals are respectively 128 kbps, 256 kbps, 384 kbps and 512 kbps, and are respectively block diagrams each showing the configuration of the variable rate transmission apparatus according to embodiment 2 shown in FIG. 13.

The operation will next be described.

The S/P converter 80 inputs input signals each having a fast data rate therein and converts them into parallel data signals. The FEC units 81 input the four maximum parallel data signals converted by the S/P converter 80 therein and perform a series of processes such as an error correction coding process, convolution coding process, an interleave process and a framing process with the insertion of pilot symbols and CRC therein, etc. on the signals. Parallel data signals outputted from the respective FEC units 81 are inputted to the inside of the adaptive modulation unit 4 employed in the variable rate transmission apparatus according to the embodiment 1. Since the subsequent operations are just the same as those of the adaptive modulation unit 4 and the QPSK spreader 5 employed in the variable rate transmission apparatus according to the embodiment 1 shown in FIGS. 4 through 10, their description will not be described.

In the variable rate transmission method and variable rate transmission apparatus according to embodiment 2 as described above, data signals are first converted into serial/parallel form and a series of signal processes such as error correction coding, etc. is effected on the resultant parallel data signals to thereby generate bi-orthogonal signals without having to use a multicode, after which a plurality of signal sequences are transmitted.

According to embodiment 2, as has been described above, input signals sent at a fast data rate are first converted into serial/parallel form and are then separated into a plurality of spreading code channels. Thereafter, a series of signal processes such as error correction coding, etc. is effected to thereby generate bi-orthogonal signals without having to use a multicode, after which a plurality of signal sequences are transmitted. Thus, since data signals are spreading-modulated and transmitted in a binary sequential state by using bi-orthogonal signals obtained by Walsh functions at symbol spreading portions in the case of the transmission of each individual signals at a data rate exceeding a basic rate in a manner similar to the embodiment 1, a linear characteristic of a power amplifier 6 can be maintained even in the case of a fast data rate. Further, little interference is given to adjacent frequency bands and high-quality data transmission can be performed. Since Walsh functions are used, the configuration of hardware is easy and a demodulating process can be also implemented in a simple configuration. Since the bi-orthogonal signals are generated using Walsh functions, data error-rate characteristics are improved and higher-quality data transmission can be carried out. Incidentally, the QPSK spreader is used for spreading modulation in the present embodiment. Although the bi-orthogonal signals are dual-inputted in this case, an envelope variation is not produced in a manner similar to the normal QPSK.

INDUSTRIAL APPLICABILITY

As described above, the variable rate transmission method and variable rate transmission apparatus according to the present invention is suitable for holding a linear characteristic of a power amplifier and transmitting high-quality data even if a data rate is high.

What is claimed is:

1. A variable rate transmission apparatus for transmitting data signals, comprising:
    a signal processing configuration for effecting a series of signal processes on said data signals;
    a first serial/parallel converter for performing serial/parallel conversion on the output of said signal processing configuration;
    a spread modulation configuration for spread modulating data signals, upon a transmission rate of said data signals being greater than or equal to a predetermined transmission rate, in a binary sequence using bi-orthogonal signals, and spread modulating data signals in a binary sequence without using bi-orthogonal signals when said data signals are transmitted at a rate lower than the predetermined transmission rate; and
    a transmitting configuration which transmits the spread modulated data signals that are outputted from said spread modulation configuration,
    wherein said spread modulation configuration modulates parallel signals outputted from said first serial/parallel converter, and said transmitting configuration transmits the resultant signals, respectively.

2. The variable rate transmission apparatus according to claim 1, further comprising:
    a second serial/parallel converter for converting data signals into serial/parallel form; and
    a second signal processing configuration provided so as to correspond to the respective parallel data signals outputted from said second serial/parallel converter and for performing a series of signal processes on the said data signals,
    wherein the spread modulation configuration modulates signals outputted from said second signal processing configuration and said transmitting configuration transmits the resultant signals, respectively.

3. The variable rate transmission apparatus according to claim 1, wherein said spread modulation configuration generates the bi-orthogonal signals by using Walsh functions.

4. A variable rate transmission method comprising:
    detecting the transmission rate of received data signals by comparing the detected said transmission rate to a predetermined transmission rate;
    effecting a series of signal processes on said data signals;
    performing serial/parallel conversion on the output of said step of effecting a series of signal processes;
    spread modulating the data signals in a binary sequence using bi-orthogonal signals when said transmission rate of each data signal, in said data signals, is greater than or equal to the predetermined transmission rate and spread modulating the data signals in a binary sequence without using bi-orthogonal signals when each data signal is transmitted at a rate lower than the predetermined transmission rate; and
    transmitting the spread modulated data signals,
    wherein said step of spread modulating the data signals modulates parallel signals outputted from said step of serial/parallel conversion, and said step of transmitting transmits the resulting signals.

5. The variable rate transmitting method according to claim 4, wherein Walsh functions are used to obtain bi-orthogonal signals.

6. A variable rate transmission apparatus for spread modulation of data signals by using spread coded sequences and transmitting the spread modulated data signals, comprising:
    a signal processing configuration for effecting a series of signal processes on said data signals;
    a first serial/parallel converter for performing serial/parallel conversion on the output of said signal processing configuration;
    a spread modulation configuration for spread modulating data signals in a sequence using bi-orthogonal signals when said data signals are transmitted at a rate greater or equal to a predetermined transmission rate, and spread modulating data signals in a sequence without using bi-orthogonal signals when said data signals are transmitted at a rate lower than the predetermined transmission rate; and
    a transmitting configuration which transmits the spread modulated data signals that are outputted from said spread modulation configuration,
    wherein said spread modulation configuration modulates parallel signals outputted from said serial/parallel converter and said transmitting configuration transmits the resultant signals, respectively.

* * * * *

UNITED STATES PATENT AND TRADEMARK OFFICE
CERTIFICATE OF CORRECTION

PATENT NO.      : 6,628,667 B1
DATED           : September 30, 2003
INVENTOR(S)     : Murai et al.

It is certified that error appears in the above-identified patent and that said Letters Patent is hereby corrected as shown below:

<u>Title page,</u>
Item [30], should read:

-- [30]     Foreign Application Priority Data

Jun. 20, 1997          (JP)……………….. 9-164202 --

Signed and Sealed this

Twentieth Day of July, 2004

JON W. DUDAS
*Acting Director of the United States Patent and Trademark Office*